Oct. 17, 1950 R. F. ZAROBAN 2,526,313
MINIATURE GREENHOUSE
Filed June 6, 1946 2 Sheets-Sheet 1
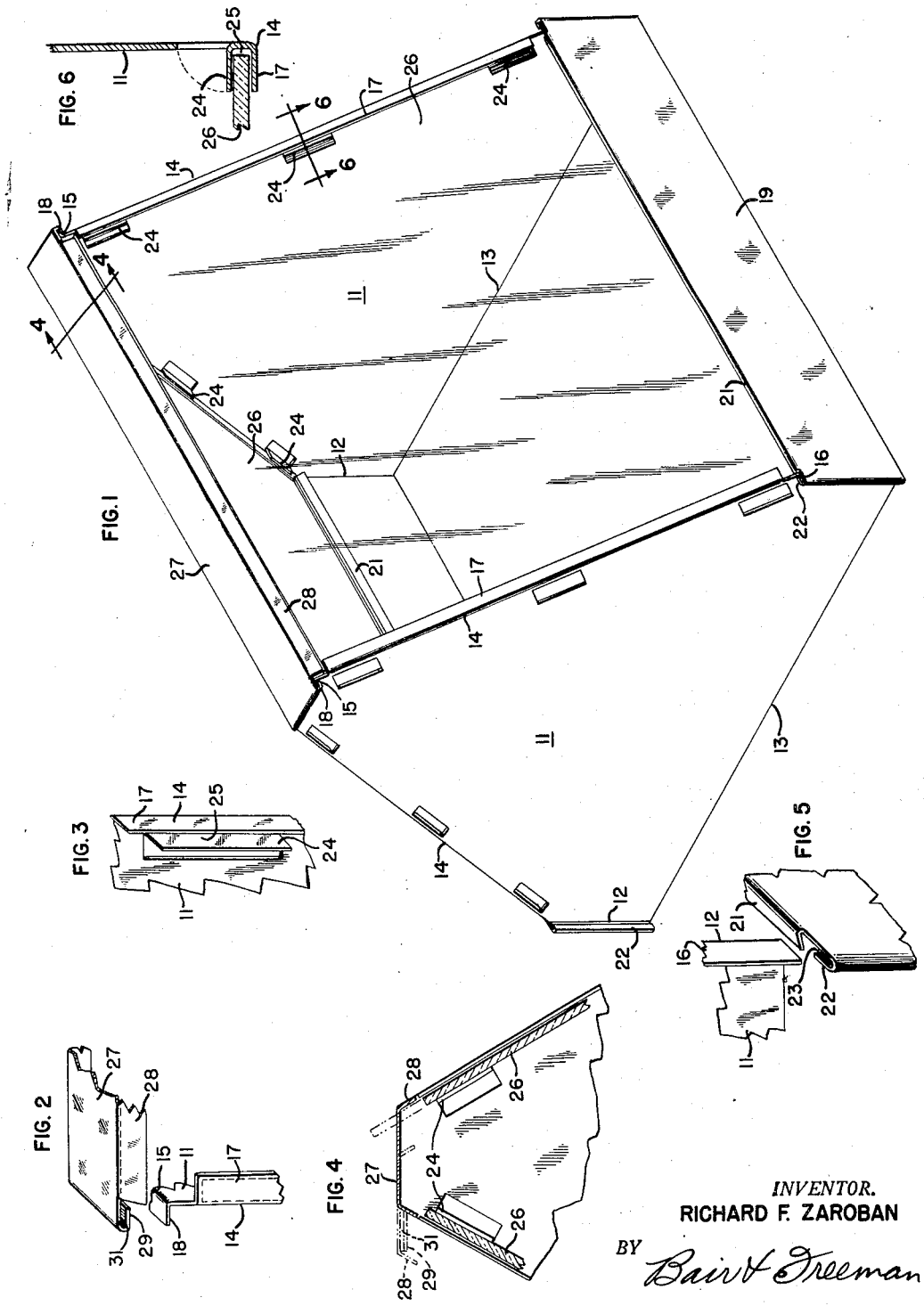
INVENTOR.
RICHARD F. ZAROBAN
BY Bair & Freeman
ATTORNEYS

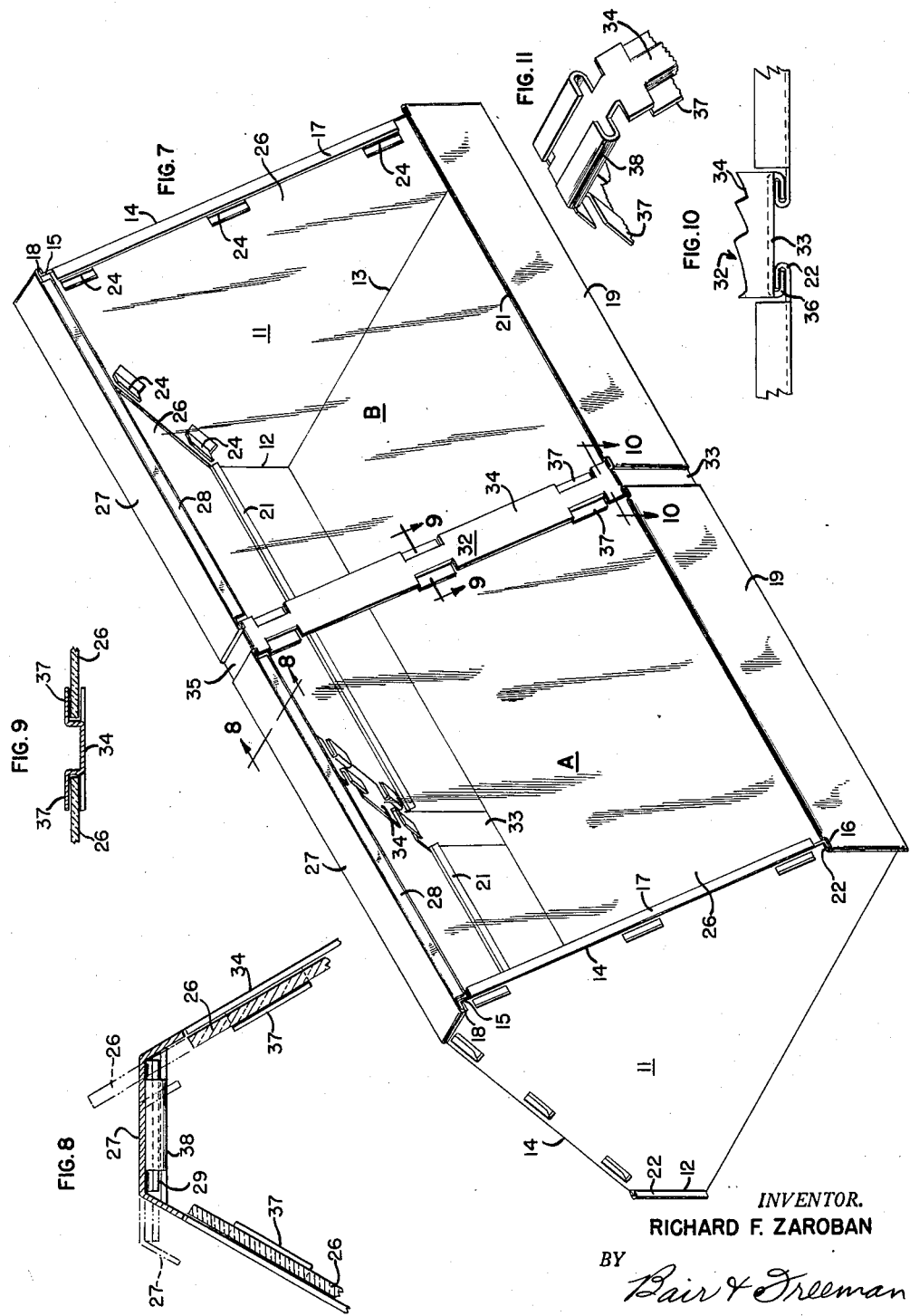

Patented Oct. 17, 1950

2,526,313

UNITED STATES PATENT OFFICE 2,526,313

MINIATURE GREENHOUSE

Richard F. Zaroban, Hastings, Nebr., assignor to Dutton-Lainson Company, Hastings, Nebr., a corporation of Nebraska Application June 6, 1946, Serial No. 674,843

3 Claims. (Cl. 47—17)

This invention relates to miniature greenhouses, and particularly to greenhouses which are used in small gardens and which are portable.

It is an object of the invention to provide a portable greenhouse which is easy to set up and to knock down for shipping or storage purposes.

It is also an object of the invention to provide a light, inexpensive miniature greenhouse and particularly to form a miniature greenhouse of stamped sheet metal parts and glass or other transparent material.

It is a further object of the invention to provide a novel construction for retaining the transparent panels of a portable greenhouse in position and to provide for ready assembly or replacement of the transparent material.

It is still a further object of the invention to provide a fabricated portable greenhouse which is so constructed that one section may be used, or as many sections as desired may be assembled together.

It is also an object of the invention to provide novel joints for various sheet metal portions of a portable greenhouse.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Figure 1 is a perspective view of a portable greenhouse illustrating one embodiment of the invention;

Figure 2 is a detail exploded perspective view of the joint for the top and side sheet metal plates or structural members of the greenhouse;

Figure 3 is a detail perspective view of the supporting flanges for the transparent panels;

Figure 4 is a partial sectional view taken on line 4—4 of Figure 1;

Figure 5 is a detail exploded perspective view of the joint for the side and bottom structural members or plates of the greenhouse;

Figure 6 is a partial sectional view taken on line 6—6 of Figure 1;

Figure 7 is a perspective view of a portable greenhouse illustrating another embodiment of the invention;

Figure 8 is a partial sectional view taken on line 8—8 of Figure 7;

Figure 9 is a partial sectional view taken on line 9—9 of Figure 7;

Figure 10 is a partial sectional view taken on line 10—10 of Figure 7; and

Figure 11 is a detail view of the upper horizontal surface of the stile member.

Referring specifically to Figures 1 to 6 inclusive for a detailed description of the first embodiment of the invention, numeral 11 designates generally two vertical side walls of the miniature greenhouse illustrated in Figure 1. The side walls 11 are generally triangular in shape and have vertically extending edges 12 extending upwardly a short distance from a bottom edge 13, sloping edges 14 extending from said vertical edges 13 and a short horizontal top edge 15 connecting the sloping edges 14.

The vertical edges 12 are provided with flanges 16 extending outwardly at right angles to the vertical side walls 11 and the sloping edges 13 are provided with flanges 17 extending inwardly at right angles to the vertical side walls 11. The flanges 17 terminate a short distance from the vertical edges 12 and top edge 15, respectively. The top edge 15 is also provided with a flange 18 extending outwardly at right angles to the vertical side walls 11.

Two vertically extending transverse walls 19 connect the two side walls 11 at the vertical edges 12 thereof, and, as best shown in Figure 5, the transverse walls 19 are provided with substantially right angle inwardly extending flanges 21 along the top thereof, which flanges 21 terminate short of reversely bent portions 22 which form a recess or groove 23 in the vertical edges of the transverse walls 19.

As best shown in Figures 1 and 5, the side walls 11 and transverse walls 19 are locked together by flange 16 on side wall 11 entering the groove 23 on transverse wall 19 at each corner of the greenhouse.

Referring to Figures 1, 3, 4 and 6, it will be seen that spaced flanges 24 are punched from side walls 11 adjacent the sloping edges 14 and extend inwardly at right angles from the side walls 11, thereby forming, with the flanges 17, inwardly opening grooves 25.

Two sloping panels 26 of relatively rigid transparent material, preferably glass, are slid from the top of the greenhouse into the grooves 25 formed between flanges 17 and 24, until the panels 26 rest on inwardly extending flanges 21 on the transverse walls 19. Obviously, the panels 26 of transparent material are then retained in position between the various flanges and afford substantially unrestricted passage of sunlight and heat rays. It is also clear that the greenhouse is open at the bottom and rests directly on the ground, surrounding an area of plants to be grown, which then receive the beneficial effects of sun and heat and are effectively protected against cold temperatures, wind, snow, et cetera.

A top panel or cover generally indicated at 27 is provided with downwardly extending flanges 28 along its long edges, the angle of which substantially corresponds to the angle of the sloping glass panels 26. Flanges 28 terminate a short distance from the ends of the top panel 27. As best shown in Figure 2, the ends of cover 27 are provided with reversely bent portions 29 which form grooves 31 and flanges 18 of side walls 11 are slidably received therein. As shown in Figure 4, it is not necessary to completely remove cover 27 to remove or replace a transparent panel 26, since the cover may be slid partially to one side, as shown in the dot and dash lines in Figure 4, to uncover the top of one side of a panel 26 to permit its removal or replacement.

Referring now to Figures 7 to 10 inclusive for a detailed description of a second embodiment of the invention, it will be noted that all the elements utilized are the same as used in the first embodiment of the invention, with the exception of a central stile, generally indicated at 32. By utilizing the stile 32, as many sections of the greenhouse, indicated by the letters A and B, may be joined together as desired, and the length of the greenhouse is unlimited. Like reference numerals have been given to like parts in the first and second embodiments, and since the manner of assembling them is identical in both embodiments, the description of the greenhouse shown in the second embodiment includes the stile 32 and its associated parts only.

As is apparent from Figure 7, two sections A and B of the construction shown in Figure 1 are placed in lengthwise abutting relation, with the vertical side walls which would face each other removed. The stile 32, which is formed in one piece, comprises a flat sheet metal member bent into a shape which conforms with the configuration of the side walls 11. The stile 32, therefore, has bottom vertical portions 33, upwardly sloping portions 34 extending from vertical portions 33, and a short horizontal portion 35 connecting the upper ends of the sloping portions 34.

As best shown in Figure 10, the vertical portions 33 of stile 32 are provided with reversely bent flanges 36 which slide into grooves 23 and interlock with reversely bent portions 22 of the adjacent transverse walls 19 of the two greenhouse sections A and B, thus locking the two sections together.

The sloping portions 34 of stile 32 have a plurality of L-shaped flanges 37 struck from adjacent both edges thereof, which flanges lie below the plane of the sloping portion 34 of the stile 32, so that the transparent panels 26 may slide between the edges of sloping portion 34 and the L-shaped flanges 37 and be retained therein, as shown in Figures 7 and 9.

The top wall 35 of stile 32 is provided with two reversely bent portions 38 which interlock with the reversely bent flanges 29 on adjacent cover members 27 and permit sliding movement of the cover members 27 to the dot and dash position shown in Figure 8, thereby affording the insertion or removal of the transparent panels 26 without completely removing the covers 27.

From the foregoing, it will be apparent that novel portable greenhouse constructions have been provided which are easy to set up or knock down, and which may have as many sections as desired. Furthermore, the transparent panels are easily removed or replaced.

Some changes may be made in the construction and arrangement of the parts of my miniature greenhouse without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A sheet metal side wall for an open bottom miniature greenhouse including transparent panels, said side wall having a bottom edge, upwardly sloping converging edges extending from adjacent said bottom edge, an inturned flange on said upwardly sloping edges, and a plurality of second inturned flanges on said side wall adjacent and parallel to said first inturned flange, said inturned flanges forming grooves for the reception of said transparent panels, said first inturned flange being bent from the upwardly sloping edges of the side wall, and said second inturned flanges being cut from the material of said side wall and bent inwardly thereof adjacent said first inturned flange.

2. An open bottom miniature greenhouse having transparent panels comprising a pair of sheet metal side wall members, said side wall members having horizontal bottom edges extending upwardly from the bottom edge, upwardly sloping converging edges extending from said upwardly extending edges and a top horizontal edge, a pair of transverse members extending between the bottom portion of said side wall members, flanges on said upwardly extending edges and on transverse members releasably engaging with each other to lock said side wall members and said transverse members together, flanges adjacent said upwardly sloping edges forming a groove for the reception of said transparent panels, a cover for said transparent panels extending between said side walls, and cooperating flange means on said top edge of the side walls and on said cover member to lock said side walls and cover together, said flanges being arranged to afford horizontal sliding movement of the cover relative to the side walls.

3. An open bottom miniature greenhouse comprising a plurality of sections, the end sections including a vertical side wall, a pair of transparent upwardly converging panels for each section, a pair of spaced transverse locking members adjacent the bottom of each section, substantially flat stile means substantially conforming to the shape of the side walls disposed between each section, means for slidably locking said transverse locking members to said side walls and to said stile means, cooperating upper and lower flanges on said side walls and said stile means for slidably retaining said transparent panels in position, the lower flanges on the stile means being formed by bending the metal of both edges of the stile means downwardly and then parallel to the flat portions thereof at spaced locations thereon, and a horizontal flange on said transverse members upon which said transparent panels rest when in position.

RICHARD F. ZAROBAN.

REFERENCES CITED

The following references are of record in the file of this patent:

UNITED STATES PATENTS

| Number | Name | Date |
|---|---|---|
| 159,346 | Musgrove | Feb. 2, 1875 |
| 1,266,131 | Krantz | May 14, 1918 |
| 2,231,065 | Gabel | Feb. 11, 1941 |

FOREIGN PATENTS

| Number | Country | Date |
|---|---|---|
| 5,518 | Great Britain | Mar. 4, 1914 |